Aug. 2, 1938.  G. L. GLOSSBRENNER  2,125,338
NURSING BOTTLE NIPPLE
Filed Oct. 28, 1935

INVENTOR.
George L. Glossbrenner,
BY
Hood + Hahn.
ATTORNEY.

Patented Aug. 2, 1938

2,125,338

UNITED STATES PATENT OFFICE 2,125,338

NURSING BOTTLE NIPPLE

George L. Glossbrenner, Chicago, Ill.

Application October 28, 1935, Serial No. 47,081

3 Claims. (Cl. 128—252)

My invention relates to improvements in nipples used on nursing bottles and has particular reference to constructions which will prevent the creation of a vacuum in the bottle, thus preventing the nipple from collapsing thereby stopping the flow of milk out of the bottle and causing the infant to suck and swallow air, thus causing colic.

In such types of nursing nipples as are now in commercial use, the construction is such that no means is provided for the free ingress of air during the period that the infant is sucking on the nipple for the purpose of removing the milk from the bottle. As a result, after the infant has sucked on the nipple for a comparatively short length of time, the air in the bottle is reduced to a pressure less than normal atmospheric pressure, and a partial vacuum created, causing the nipple to collapse and thus prevent the free flow of milk from the bottle.

It is one of the objects of my invention to provide a structure which will overcome this objection and to this end I provide a nipple structure which will permit air to enter the bottle up around the neck and thus, even though the infant retains the nipple in its mouth, a proper supply of air will be admitted to the interior of the bottle and prevent the formation of a partial vacuum therein, thus permitting a continuous free flow of milk through the nipple.

For the purpose of disclosing my invention, I have illustrated certain embodiments thereof in the accompanying drawing, in which.

Figure 2:
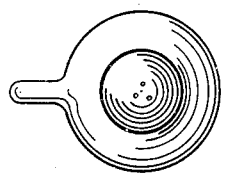
Fig. 2 is a top plan view thereof.
Figure 1:
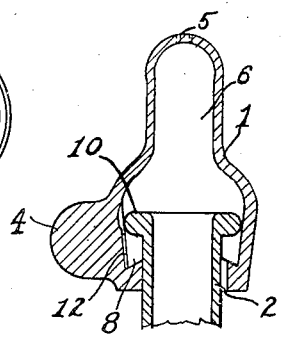
Fig. 1 is a sectional view of a nipple embodying my invention.

Referring first to the structure illustrated in Figs. 1 and 2, the nipple 1 is shown applied to the neck 2 of a nursing bottle. The base 3 of the nipple is provided with a vertical tab or extension 4 adapted to be grasped by the fingers to assist in the placing of the nipple on the bottle neck. The nipple has the usual outlet perforations 5 in the tip thereof communicating with the inner flow channel 6 and the base 3 provided at its bottom on the interior with an inwardly extending bead 7, thereby forming a neck receiving chamber 8. The base portion 3 is adapted to surround the bottle neck and is somewhat enlarged as compared with the opposite end of the nipple. The bead 7 at one point is provided with a longitudinally extending groove 9 which is preferably formed on the same side as the tab 4 in order that additional strength may be given at this point. Due to the fact that the base 3 may closely surround the bead 10 formed on the neck of the bottle, the base of the nipple is interiorly provided on one side, and preferably the side opposite the groove 9, with a longitudinally extending groove 12 so that air entering the chamber 8 may flow from this chamber 8, pass through the groove 12, and into the channel 6 and the bottle. The bead 7 is constructed with an angular top or projection 4, to prevent chamber 8 from being closed even though bead 7 of the nipple is placed against bead 10 of the bottle neck 2.

Figure 3:
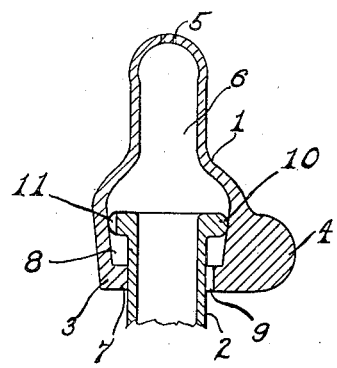
Fig. 3 is a sectional view of a combined nipple and bottle embodying a modification of my invention.

In the structure illustrated in Fig. 3, the construction of the nipple 1 is substantially the same as that illustrated in Fig. 1. This embodiment of the invention, however, contemplates the provision of a special bottle provided with a groove 11 in its bead 10, which replaces, and serves the function of, the groove 12 formed in the base of the nipple in Fig. 1.

Figure 4:
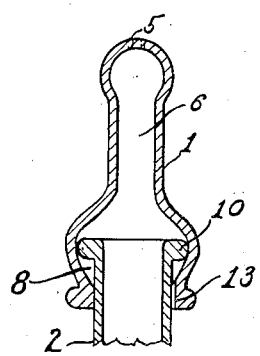
Fig. 4 is a sectional view of a still further modification of my invention.

In the structure illustrated in Fig. 4, I have shown a slightly different shaped nipple, the walls of this nipple being such that they are sufficiently flexible to permit the air passing through the groove 13 into the base of the nipple, to pass out from the air chamber 8 into the flow channel 6.

The air chamber 8 in each instance may be adjusted as to size so that the amount of air entering the bottle may be, to an extent, controlled, by moving the nipple up or down on the bottle neck to position the bead 7 closer to, or further away from, the bead 10 on the bottle neck.

I claim as my invention:—

1. The combination with a nursing bottle and a nursing nipple therefor, the nipple comprising a base portion and a neck portion, the base portion being constructed to embrace the neck of the bottle below the bead and spaced apart therefrom and having a portion embracing the bead of the bottle neck, and an air inlet groove formed in said base portion at the point where it embraces the neck of the bottle, and a secondary inlet groove formed between the bead of the bottle and that portion of the nipple embracing the bead and at a point opposite the first groove.

2. A nursing nipple comprising a neck portion and a base portion, the base portion being adapted to surround and embrace a bottle neck, said base portion having a longitudinally extending groove in the inner face thereof to provide a channel between the bottle surface and the base portion and having at an opposite point a second groove at the point where the base portion contacts the bead of the bottle to form a second channel therein.

3. A nursing nipple comprising a neck portion and a base portion, the base portion having at its lower end an internally formed annular rib adapted to embrace a bottle neck at a point spaced apart from the bead of the bottle neck, said rib having a longitudinal channel in the inner face thereof and said base portion at a point opposite the channeled point on the rib, having a secondary channel formed in the inner face thereof at the point where the base portion contacts the bead.

GEORGE L. GLOSSBRENNER.